United States Patent
Sung et al.

(10) Patent No.: US 12,227,639 B2
(45) Date of Patent: Feb. 18, 2025

(54) THERMOPLASTIC RESIN COMPOSITION AND EXTERIOR MATERIAL INCLUDING THE SAME

(71) Applicant: LG CHEM, LTD., Seoul (KR)

(72) Inventors: Daeun Sung, Daejeon (KR); Tae Hoon Kim, Daejeon (KR); Ho Hoon Kim, Daejeon (KR); Chun Ho Park, Daejeon (KR); Yong Hee An, Daejeon (KR); Jeongmin Jang, Daejeon (KR); Wangrae Joe, Daejeon (KR)

(73) Assignee: LG Chem, Ltd., Seoul (KR)

( * ) Notice: Subject to any disclaimer, the term of this patent is extended or adjusted under 35 U.S.C. 154(b) by 549 days.

(21) Appl. No.: 17/764,438

(22) PCT Filed: Mar. 9, 2021

(86) PCT No.: PCT/KR2021/002884
§ 371 (c)(1),
(2) Date: Mar. 28, 2022

(87) PCT Pub. No.: WO2022/019431
PCT Pub. Date: Jan. 27, 2022

(65) Prior Publication Data
US 2022/0372268 A1 Nov. 24, 2022

(30) Foreign Application Priority Data

Jul. 23, 2020 (KR) .................. 10-2020-0091653
Mar. 3, 2021 (KR) .................. 10-2021-0028289

(51) Int. Cl.
| | |
|---|---|
| *C08L 51/00* | (2006.01) |
| *C08F 212/08* | (2006.01) |
| *C08F 220/44* | (2006.01) |
| *C08L 25/12* | (2006.01) |
| *C08L 77/02* | (2006.01) |

(52) U.S. Cl.
CPC .......... *C08L 51/003* (2013.01); *C08F 212/08* (2013.01); *C08F 220/44* (2013.01); *C08L 25/12* (2013.01); *C08L 77/02* (2013.01); *C08L 2201/08* (2013.01); *C08L 2203/30* (2013.01); *C08L 2205/025* (2013.01); *C08L 2205/035* (2013.01); *C08L 2205/18* (2013.01); *C08L 2207/53* (2013.01)

(58) Field of Classification Search
CPC .......... C08L 25/12; C08L 51/04; C08L 77/06
See application file for complete search history.

(56) References Cited

U.S. PATENT DOCUMENTS

| | | |
|---|---|---|
| 5,912,305 A | 6/1999 | McKee et al. |
| 2002/0173584 A1 | 11/2002 | Ebert et al. |
| 2011/0319550 A1 | 12/2011 | Weber et al. |

FOREIGN PATENT DOCUMENTS

| | | | |
|---|---|---|---|
| CN | 109423043 | A | 3/2019 |
| EP | 4 011 972 | A1 | 6/2022 |
| JP | H04348150 | A | 12/1992 |
| JP | H11302480 | A | 11/1999 |
| JP | 2004315799 | A * | 11/2004 |
| JP | 2005-187729 | A | 7/2005 |
| JP | 2005220344 | A | 8/2005 |
| JP | 2019-38994 | A | 3/2019 |
| KR | 10-0434640 | B1 | 8/2002 |
| KR | 2002-0066822 | A | 8/2002 |
| KR | 10-2009-0095764 | A | 9/2009 |
| KR | 10-2011-0118657 | A | 10/2011 |
| KR | 10-2015-0069888 | A | 6/2015 |
| KR | 20150069888 | A * | 6/2015 |
| KR | 10-2018-0039481 | A | 4/2018 |
| KR | 10-2019-0110878 | A | 10/2019 |
| WO | 2022/019411 | A1 | 1/2022 |

OTHER PUBLICATIONS

Machine translation of JP 2004-315799 (no date).*
Machine translation of JP 2015-0069888 (no date).*
Office Action issued Nov. 17, 2023 for corresponding Chinese Patent Application No. 202180005623.6 Citation: KR 2019-0110878 is of record.
Office Action issued in corresponding Japanese Patent Application No. 2022-522360, dated May 29, 2023.
International Search Report and Written Opinion issued in corresponding International Patent Application No. PCT/KR2021/002884, dated Jun. 21, 2021.
Extended European Search Report issued in corresponding European Patent Application No. 21 846 086.3, dated Oct. 24, 2022.

* cited by examiner

*Primary Examiner* — Marc S Zimmer

(74) *Attorney, Agent, or Firm* — Morgan, Lewis & Bockius LLP

(57) ABSTRACT

The present disclosure relates to a thermoplastic resin composition and an exterior material including the same. The thermoplastic resin composition includes 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more. Both the first and second polyamide resins have a relative viscosity of 2.5 or less. The present disclosure advantageously provides a low-gloss thermoplastic resin composition having excellent aesthetics, such as softness, luxuriousness, and naturalness, due to uniform and low gloss, and improvement in surface texture while having mechanical properties and processability equal or superior to those of conventional ASA resins; and an exterior material including the low-gloss thermoplastic resin composition.

15 Claims, 1 Drawing Sheet

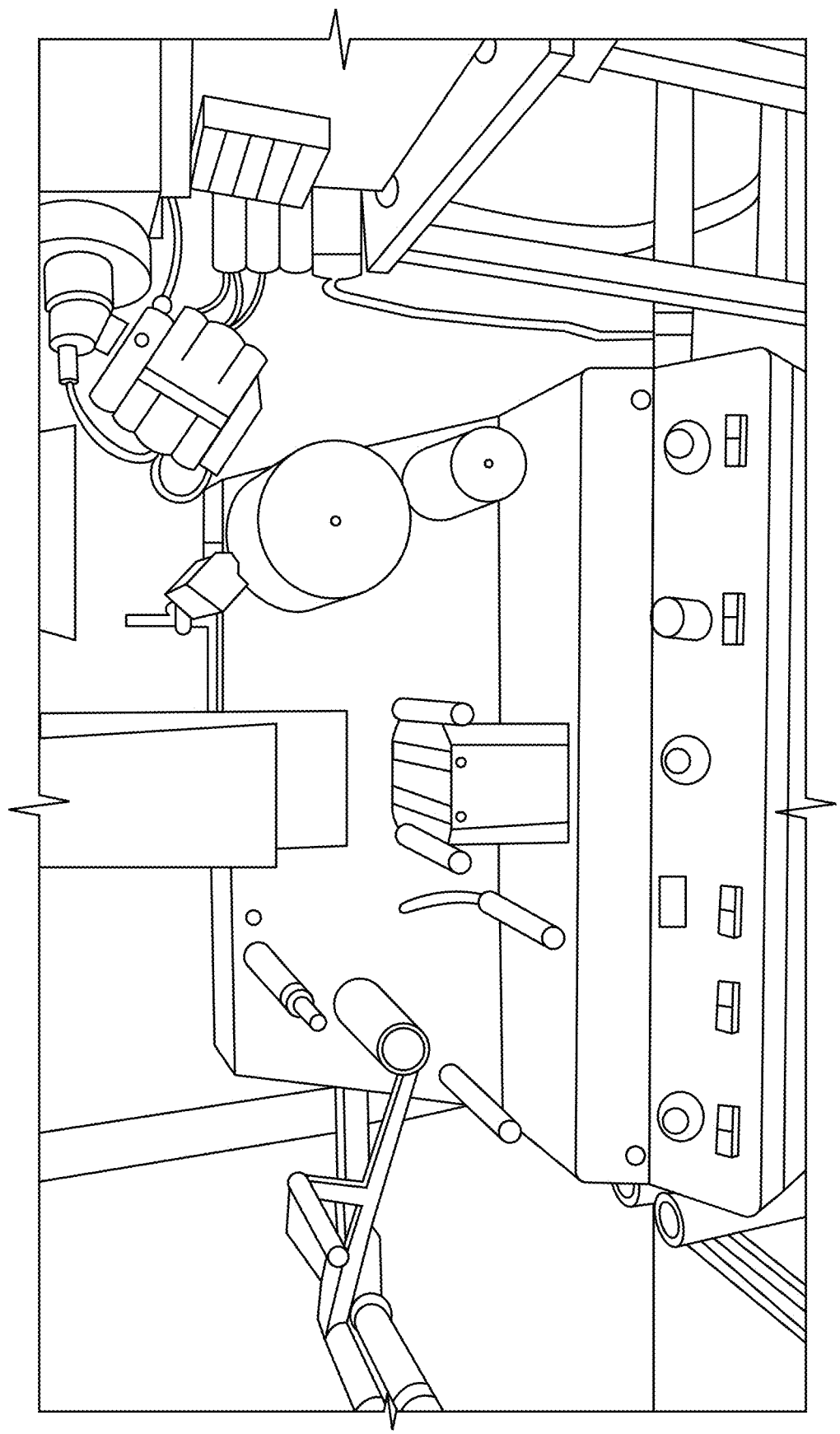

THERMOPLASTIC RESIN COMPOSITION AND EXTERIOR MATERIAL INCLUDING THE SAME

CROSS-REFERENCE TO RELATED APPLICATIONS

This application claims priority to Korean Patent Application No. 10-2020-0091653, filed on Jul. 23, 2020, and Korean Patent Application No. 10-2021-0028289, re-filed on Mar. 3, 2021, based on the priority of the above patent, in the Korean Intellectual Property Office, the disclosures of each of which are incorporated herein by reference.

TECHNICAL FIELD

The present invention relates to a thermoplastic resin composition and an exterior material including the same. More particularly, the present invention relates to a low-gloss thermoplastic resin composition having excellent weather resistance, capable of providing an aesthetically pleasing effect and a soft feeling due to a low surface roughness value thereof, and having uniform surface gloss while having mechanical properties and processability equal or superior to those of conventional ASA resins; and an exterior material including the thermoplastic resin composition.

BACKGROUND ART

Acrylate compound-styrene-acrylonitrile copolymers (hereinafter referred to as "ASA resins") have weather resistance, aging resistance, chemical resistance, rigidity, impact resistance, and processability, and have been widely used in various fields such as automobiles, miscellaneous goods, and construction materials.

In the case of ASA resins used in exterior materials, there is increasing need for development of a low-gloss ASA resin that can satisfy aesthetic demands without the artificial feeling of plastics.

Conventionally, crystalline resins such as nylon have been used as low-gloss ASA resins. However, the crystalline resins have limitations in improving surface texture and aesthetics.

RELATED ART DOCUMENTS

Patent Documents

KR 2009-0095764 A

DISCLOSURE

Technical Problem

Therefore, the present invention has been made in view of the above problems, and it is one object of the present invention to provide a low-gloss thermoplastic resin composition having excellent aesthetics, such as softness, luxuriousness, and naturalness, due to uniform and low gloss, and improvement in surface texture while having mechanical properties and processability equal or superior to those of conventional ASA resins; and an exterior material including the low-gloss thermoplastic resin composition.

The above and other objects can be accomplished by the present invention described below.

Technical Solution

In accordance with one aspect of the present invention, provided is a thermoplastic resin composition including 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more, wherein both the first and second polyamide resins have a relative viscosity (96% sulfuric acid solution) of 2.5 or less.

In this description, relative viscosity may be measured using a Ubbelohde viscometer according to the ISO 307 sulfuric acid method. Specifically, relative viscosity may be measured using a solution prepared by dissolving 1 g of a sample in 100 ml of a 96 wt % aqueous sulfuric acid solution. In this case, measurement may be performed at 20° C. using a Brookfield rotational viscometer.

In addition, the present invention may provide a thermoplastic resin composition including 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more. In this case, when a gloss value at 60° of a film prepared by film-processing pellets, which have been extruded at 280° C., under conditions of barrel temperatures of 50° C., 190° C., 190° C., and 190° C. and die temperatures of 200° C., 200° C., and 200° C. and a gloss value at 60° of a film prepared by film-processing pellets, which have been extruded at 280° C., under conditions of barrel temperatures of 50° C., 200° C., 210° C., and 210° C. and die temperatures of 220° C., 220° C., and 230° C. are measured, a deviation between the measured gloss values is 3.0 or less.

In addition, the present invention may provide a thermoplastic resin composition including 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more, wherein the styrene-based resins include a first styrene-based resin and a second styrene-based resin, wherein the first styrene-based resin includes one or more selected from the group consisting of an acrylate-aromatic vinyl compound-vinyl cyanide compound graft copolymer (A-1) containing acrylate rubber having a DLS average particle diameter of 0.05 to 0.2 μm or a TEM average particle diameter of 0.03 to 0.2 μm and an acrylate-aromatic vinyl compound-vinyl cyanide compound graft copolymer (A-2) containing acrylate rubber having a DLS average particle diameter of 0.3 to 0.5 μm or a TEM average particle diameter of 0.25 to 0.45 μm, and the second styrene-based resin includes one or more selected from the group consisting of an aromatic vinyl compound-vinyl cyanide compound copolymer (B-1), a heat-resistant styrene-based resin (B-2), and a methacrylate-aromatic vinyl compound-vinyl cyanide compound copolymer (B-3).

In accordance with another aspect of the present invention, provided is an exterior material including the thermoplastic resin composition.

The exterior material may be a siding material, a roofing material, or a decking material.

Advantageous Effects

As apparent from the foregoing, the present invention advantageously provides a low-gloss thermoplastic resin composition having excellent aesthetics, such as softness, luxuriousness, and naturalness, due to uniform and low gloss, and improvement in surface texture while having mechanical properties and processability equal or superior to those of conventional ASA resins; and an exterior material including the low-gloss thermoplastic resin composition.

DESCRIPTION OF DRAWINGS

FIGURE shows a film extruder used in Examples.

BEST MODE

Hereinafter, a thermoplastic resin composition and an exterior material including the same according to the present invention will be described in detail.

The present inventors confirmed that, when two types of polyamides having different melting temperatures (Tm) and having a relative viscosity of 2.5 or less were added in predetermined amounts to predetermined styrene-based resins, or when two types of polyamides having different melting temperatures (Tm) were added in predetermined amounts to predetermined styrene-based resins and the deviation of film gloss at 45° according to extrusion conditions for a thermoplastic resin composition was adjusted within a predetermined range, compared to conventional ASA resin compositions, mechanical properties, weather resistance, and processability were not deteriorated, and uniform and low gloss, and natural and luxurious surface texture different from that of plastic were realized. Based on these results, the present inventors conducted further studies to complete the present invention.

The thermoplastic resin composition of the present invention includes 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more. In this case, both the first and second polyamide resins have a relative viscosity of 2.5 or less. In this case, a thermoplastic resin composition having excellent weather resistance, having low and uniform surface gloss, and capable of providing an aesthetically pleasing effect and a soft feeling due to a low surface roughness value thereof while having mechanical properties and processability equal or superior to those of conventional ASA resins may be provided.

In addition, the thermoplastic resin composition of the present invention includes 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more. In this case, when a gloss value at 60° of a film prepared through extrusion (280° C.) and film processing (190° C.) and a gloss value at 60° of a film prepared through extrusion (280° C.) and film processing (220° C.) are measured, the deviation between the measured gloss values is 3.0 or less. In this case, a thermoplastic resin composition having excellent weather resistance, having low and uniform surface gloss, and capable of providing an aesthetically pleasing effect and a soft feeling due to a low surface roughness value thereof while having mechanical properties and processability equal or superior to those of conventional ASA resins may be provided.

In addition, the thermoplastic resin composition of the present invention includes 100 parts by weight of styrene-based resins; 0.5 to 5 parts by weight of a first polyamide resin having a melting temperature (Tm) of 230° C. or less; and 0.5 to 10 parts by weight of a second polyamide resin having a melting temperature (Tm) of 250° C. or more. In this case, the styrene-based resins include a first styrene-based resin and a second styrene-based resin. In this case, the first styrene-based resin includes one or more selected from the group consisting of an acrylate-aromatic vinyl compound-vinyl cyanide compound graft copolymer (A-1) containing acrylate rubber having a DLS average particle diameter of 0.05 to 0.2 μm or a TEM average particle diameter of 0.03 to 0.2 μm and an acrylate-aromatic vinyl compound-vinyl cyanide compound graft copolymer (A-2) containing acrylate rubber having a DLS average particle diameter of 0.3 to 0.5 μm or a TEM average particle diameter of 0.25 to 0.45 μm, and the second styrene-based resin includes one or more selected from the group consisting of an aromatic vinyl compound-vinyl cyanide compound copolymer (B-1), a heat-resistant styrene-based resin (B-2), and a methacrylate-aromatic vinyl compound-vinyl cyanide compound copolymer. In this case, a thermoplastic resin composition having excellent weather resistance, having low and uniform surface gloss, and capable of providing an aesthetically pleasing effect and a soft feeling due to a low surface roughness value thereof while having mechanical properties and processability equal or superior to those of conventional ASA resins may be provided.

Hereinafter, each component constituting the thermoplastic resin composition of the present invention will be described in detail.

Styrene-Based Resin

The styrene-based resin preferably includes a first styrene-based resin and a second styrene-based resin.

In this description, the "styrene-based resin" follows the definition of a styrene-based resin commonly recognized in the art to which the present invention pertains and may be a resin including a unit derived from an aromatic vinyl compound.

The styrene-based resin preferably includes 10 to 70% by weight of the first styrene-based resin and 30 to 90% by weight of the second styrene-based resin, more preferably 30 to 70% by weight of the first styrene-based resin and 30 to 70% by weight of the second styrene-based resin, still more preferably 40 to 60% by weight of the first styrene-based resin and 40 to 60% by weight of the second styrene-based resin, still more preferably 40 to 55% by weight of the first styrene-based resin and 45 to 60% by weight of the second styrene-based resin, most preferably 44 to 50% by weight of the first styrene-based resin and 50 to 56% by weight of the second styrene-based resin. Within this range, weather resistance may be excellent without deterioration in mechanical properties and processability. In addition, due to low gloss, uniform surface gloss, and a low surface roughness value, an aesthetically pleasing effect and a soft feeling may be realized.

First Styrene-Based Resin

The first styrene-based resin may include one or more selected from the group consisting of an acrylate-aromatic vinyl compound-vinyl cyanide compound graft copolymer (A-1) containing acrylate rubber having a DLS average particle diameter of 0.05 to 0.2 μm or a TEM average particle diameter of 0.03 to 0.2 μm and an acrylate-aromatic vinyl compound-vinyl cyanide compound graft copolymer (A-2) containing acrylate rubber having a DLS average particle diameter of 0.3 to 0.5 μm or a TEM average particle diameter of 0.25 to 0.45 μm. Preferably, the first styrene-based resin is a mixture of the acrylate-aromatic vinyl compound-vinyl cyanide compound graft copolymer (A-1)

and the acrylate-aromatic vinyl compound-vinyl cyanide compound graft copolymer (A-2). In this case, a thermoplastic resin composition having excellent aesthetics, such as softness, luxuriousness, and naturalness, due to uniform and low gloss, and improvement in surface texture while having mechanical properties and processability equal or superior to those of conventional ASA resins may be provided.

The weight ratio (A-1:A-2) of the acrylate-aromatic vinyl compound-vinyl cyanide compound graft copolymer (A-1) to the acrylate-aromatic vinyl compound-vinyl cyanide compound graft copolymer (A-2) is preferably 1:0.5 to 2, more preferably 1:0.6 to 1.8, as a specific example, 1:0.5 to 0.9, as a more preferred example, 1:0.6 to 0.9, as another specific example, 1:1.3 to 2, as a more preferred example, 1:1.5 to 1.8. Within this range, a rough feeling may be imparted to the surface of an ASA resin product, and the ASA resin product may have excellent weather resistance, fluidity, tensile strength, and impact strength.

A-1) Acrylate-Aromatic Vinyl Compound-Vinyl Cyanide Compound Graft Copolymer Containing Acrylate Rubber Having a DLS Average Particle Diameter of 0.05 to 0.2 μm or a TEM Average Particle Diameter of 0.03 to 0.2 μm The acrylate rubber contained in the graft copolymer (A-1) preferably has a DLS or TEM average particle diameter of 0.05 to 0.18 μm, more preferably 0.05 to 0.15 μm, still more preferably 0.08 to 0.15 μm, still more preferably 0.08 to 0.12 μm. Within this range, excellent weather resistance, colorability, impact strength, chemical resistance, and surface gloss may be imparted to a final product.

In this description, the DSL average particle diameter may be measured by dynamic light scattering, and specifically, may be measured as an intensity value using a Nicomp 380 particle size analyzer (manufacturer: PSS) in a Gaussian mode. As a specific measurement example, a sample may be prepared by diluting 0.1 g of latex (TSC: 35 to 50 wt %) 1,000 to 5,000 times with distilled water, and DSL average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 psec.

In addition, in this description, the DLS average particle diameter may be an arithmetic average particle diameter in a particle size distribution measured by dynamic light scattering, specifically, a scattering intensity average particle diameter.

In this description, the TEM average particle diameter may be measured by transmission electron microscope (TEM) analysis. Specifically, the TEM average particle diameter refers to a value obtained by numerically measuring particle size on a high magnification image of a TEM and averaging the measurement results. In this case, a specific measurement example is as follows:

Sample preparation: A thermoplastic resin or a thermoplastic resin composition is prepared using an extrusion kneader.
Sample pretreatment: Trimming (23° C.)→hydrazine treatment (72° C., 5 days)→sectioning (−120° C.)→OsO$_4$ vapor staining for 2 hours
Analyzer: TEM (JEM-1400, Jeol Co.)
Analysis conditions: Acc. Volt: 120 kV, spot size: 1 (×10K, ×25K, ×50K)
Size (average particle diameter) measurement: An average diameter of particles in the top 10% of a particle diameter distribution is measured.

For example, based on a total weight of the styrene-based resin, the graft copolymer (A-1) may be included in an amount of 10 to 35% by weight, preferably 15 to 35% by weight, more preferably 15 to 30% by weight. Within this range, weather resistance, fluidity, tensile strength, and impact strength may be excellent.

For example, the graft copolymer (A-1) may include 40 to 60% by weight of the acrylate rubber, 20 to 45% by weight of an aromatic vinyl compound, and 10 to 20% by weight of a vinyl cyanide compound, preferably 40 to 60% by weight of the acrylate rubber, 25 to 45% by weight of an aromatic vinyl compound, and 10 to 20% by weight of a vinyl cyanide compound, more preferably 45 to 55% by weight of the acrylate rubber, 30 to 50% by weight of an aromatic vinyl compound, and 5 to 20% by weight of a vinyl cyanide compound, still more preferably 47 to 57% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In this description, a polymer including a compound refers to a polymer prepared by polymerizing the compound, and a unit in the polymerized polymer is derived from the compound.

In this description, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In this description, for example, the aromatic vinyl compound may include one or more selected from the group consisting of styrene, α-methylstyrene, m-methylstyrene, p-methylstyrene, and p-tert-butylstyrene, and is preferably styrene.

In this description, for example, the vinyl cyanide compound may include one or more selected from the group consisting of acrylonitrile, methacrylonitrile, ethylacrylonitrile, and isopropylacrylonitrile, and is preferably acrylonitrile.

For example, the graft copolymer (A-1) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limit.

A-2) Acrylate-Aromatic Vinyl Compound-Vinyl Cyanide Compound Graft Copolymer Containing Acrylate Rubber Having a DLS Average Particle Diameter of 0.3 to 0.5 μm or a TEM Average Particle Diameter of 0.25 to 0.45 μm The acrylate rubber contained in the graft copolymer (A-2) preferably has a DLS average particle diameter of 0.3 to 0.5 μm, more preferably 0.35 to 0.5 μm, still more preferably 0.35 to 0.45 μm, still more preferably 0.38 to 0.42 μm. Within this range, weather resistance may be good, and mechanical properties such as fluidity, tensile strength, and impact strength may be excellent.

The acrylate rubber contained in the graft copolymer (A-2) preferably has a TEM average particle diameter of 0.3 to 0.45 μm, more preferably 0.35 to 0.45 μm, still more preferably 0.35 to 0.42 μm, still more preferably 0.38 to 0.42 μm. Within this range, weather resistance may be good, and mechanical properties such as fluidity, tensile strength, and impact strength may be excellent.

For example, based on a total weight of the styrene-based resin, the graft copolymer (A-2) may be included in an amount of 15 to 40% by weight, preferably 20 to 35% by weight, more preferably 20 to 30% by weight. Within this range, weather resistance, fluidity, tensile strength, and impact strength may be excellent.

For example, the graft copolymer (A-2) may include 40 to 60% by weight of the acrylate rubber, 20 to 45% by weight of an aromatic vinyl compound, and 10 to 20% by weight of a vinyl cyanide compound, preferably 40 to 60% by weight of the acrylate rubber, 25 to 45% by weight of an aromatic vinyl compound, and 10 to 20% by weight of a vinyl cyanide compound, more preferably 45 to 55% by weight of the acrylate rubber, 30 to 40% by weight of an aromatic vinyl compound, and 10 to 20% by weight of a vinyl cyanide compound. Within this range, weather resistance, fluidity, tensile strength, and impact strength may be excellent.

For example, the graft copolymer (A-2) may be prepared by emulsion polymerization. In this case, weather resistance, fluidity, tensile strength, and impact strength may be excellent.

Emulsion polymerization commonly practiced in the art to which the present invention pertains may be used in the present invention without particular limit.

Second Styrene-Based Resin

The second styrene-based resin preferably includes one or more selected from the group consisting of an aromatic vinyl compound-vinyl cyanide compound copolymer (B-1), a heat-resistant styrene-based resin (B-2), and a methacrylate-aromatic vinyl compound-vinyl cyanide compound copolymer (B-3).

B-1) Aromatic Vinyl Compound-Vinyl Cyanide Compound Copolymer

The aromatic vinyl compound-vinyl cyanide compound copolymer (B-1) may include one or more selected from the group consisting of an aromatic vinyl compound-vinyl cyanide compound copolymer (i) having a weight average molecular weight of 90,000 to 135,000 g/mol; an aromatic vinyl compound-vinyl cyanide compound copolymer (ii) having a weight average molecular weight of greater than 135,000 g/mol and 155,000 g/mol or less; and an aromatic vinyl compound-vinyl cyanide compound copolymer (iii) having a weight average molecular weight of greater than 155,000 g/mol and 200,000 g/mol or less. Preferably, the aromatic vinyl compound-vinyl cyanide compound copolymer (i) alone is used as the aromatic vinyl compound-vinyl cyanide compound copolymer (B-1), or a mixture of the aromatic vinyl compound-vinyl cyanide compound copolymer (ii) and the aromatic vinyl compound-vinyl cyanide compound copolymer (iii) is used as the aromatic vinyl compound-vinyl cyanide compound copolymer (B-1). In this case, heat resistance, chemical resistance, impact strength, tensile strength, and processability may be excellent.

Based on a total weight of the styrene-based resins, the aromatic vinyl compound-vinyl cyanide compound copolymer (i) is preferably included in an amount of 30 to 60% by weight, more preferably 40 to 50% by weight. In this case, heat resistance, chemical resistance, impact strength, tensile strength, and processability may be excellent.

Based on a total weight of the styrene-based resins, the aromatic vinyl compound-vinyl cyanide compound copolymer (ii) is preferably included in an amount of 10 to 40% by weight, more preferably 20 to 30% by weight, still more preferably 20 to 25% by weight. In this case, heat resistance, chemical resistance, impact strength, tensile strength, and processability may be excellent.

Based on a total weight of the styrene-based resins, the aromatic vinyl compound-vinyl cyanide compound copolymer (iii) is preferably included in an amount of 10 to 40% by weight, more preferably 20 to 30% by weight, still more preferably 25 to 30% by weight. In this case, heat resistance, chemical resistance, impact strength, tensile strength, and processability may be excellent.

In this description, unless defined otherwise, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 µl, column model: 1×PLgel 10 µm MiniMix-B (250×4.6 mm)+ 1× PLgel 10 µm MiniMix-B (250×4.6 mm)+1× PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the aromatic vinyl compound-vinyl cyanide compound copolymer (B-1) may include 65 to 80% by weight of an aromatic vinyl compound and 20 to 35% by weight of a vinyl cyanide compound, preferably 67 to 80% by weight of an aromatic vinyl compound and 20 to 33% by weight of a vinyl cyanide compound, more preferably 70 to 75% by weight of an aromatic vinyl compound and 25 to 30% by weight of a vinyl cyanide compound. Within this range, chemical resistance, impact strength, tensile strength, and processability may be excellent.

For example, the aromatic vinyl polymer (B-1) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limit.

B-2) Heat-Resistant Styrene-Based Resin

Based on a total weight of the styrene-based resin, the heat-resistant styrene-based resin (B-2) is preferably included in an amount of 1 to 25% by weight, more preferably 5 to 20% by weight, still more preferably 10 to 20% by weight, most preferably 13 to 18% by weight. Within this range, mechanical properties, heat resistance, and processability may be excellent.

The heat-resistant styrene-based resin (B-2) may be a styrene-based resin including a heat-resistant monomer, preferably an α-methylstyrene-vinyl cyanide compound copolymer. In this case, mechanical properties and heat resistance may be excellent.

The α-methylstyrene-vinyl cyanide compound copolymer preferably includes 65 to 75% by weight of α-methylstyrene and 25 to 30% by weight of a vinyl cyanide compound. Within this range, mechanical properties and heat resistance may be excellent.

As a more preferred example, the α-methylstyrene-acrylonitrile copolymer includes 70 to 75% by weight of α-methylstyrene and 25 to 30% by weight of acrylonitrile, more preferably 60 to 75% by weight of α-methylstyrene, 0 to 10% by weight of styrene, and 20 to 30% by weight of acrylonitrile; includes 60 to 70% by weight of α-methylstyrene, 0 to 10% by weight of styrene, and 25 to 30% by weight of acrylonitrile, more preferably 60 to 75% by weight of α-methylstyrene, 5 to 10% by weight of styrene, and 20 to 30% by weight of acrylonitrile; or includes 60 to 70% by weight of α-methylstyrene, 5 to 10% by weight of styrene, and 25 to 30% by weight of acrylonitrile. Within this range, heat resistance may be excellent.

The α-methylstyrene-acrylonitrile copolymer preferably has a weight average molecular weight of 80,000 to 120,000 g/mol, more preferably 80,000 to 110,000 g/mol, still more preferably 8,5000 to 110,000 g/mol. Within this range, heat resistance may be excellent.

For example, the heat-resistant styrene-based resin (B-2) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limit.

B-3) Methacrylate-Aromatic Vinyl Compound-Vinyl Cyanide Compound Copolymer

The methacrylate-aromatic vinyl compound-vinyl cyanide compound copolymer (B-3) preferably includes 65 to 85% by weight of a methacrylate-based monomer, 10 to 30% by weight of an aromatic vinyl compound, and 5 to 10% by weight of a vinyl cyanide compound. Within this range, weather resistance may be greatly improved, and due to a low surface roughness value, an aesthetically pleasing effect and a soft feeling may be realized.

The methacrylate-aromatic vinyl compound-vinyl cyanide compound copolymer (B-3) is preferably included in an amount of 5 to 65% by weight, more preferably 5 to 45% by weight, still more preferably 5 to 20% by weight, most preferably 5 to 15% by weight. Within this range, weather resistance may be greatly improved, and due to a low surface roughness value, an aesthetically pleasing effect and a soft feeling may be realized.

As another example, the methacrylate-aromatic vinyl compound-vinyl cyanide compound copolymer (B-3) may be included in an amount of 30 to 65% by weight, preferably 35 to 60% by weight, more preferably 40 to 60% by weight, still more preferably 40 to 58% by weight. Within this range, weather resistance may be greatly improved, and due to a low surface roughness value, an aesthetically pleasing effect and a soft feeling may be realized.

In this description, for example, the methacrylate monomer may be an alkyl methacrylate containing an alkyl group having 1 to 15 carbon atoms. As a specific example, the methacrylate monomer may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

The methacrylate-aromatic vinyl compound-vinyl cyanide compound copolymer (B-3) preferably has a weight average molecular weight of 70,000 to 200,000 g/mol, more preferably 100,000 to 150,000 g/mol, still more preferably 120,000 to 140,000 g/mol. Within this range, weather resistance, fluidity, tensile strength, and impact strength may be excellent, and due to a low surface roughness value, an aesthetically pleasing effect and a soft feeling may be realized.

For example, the methacrylate-aromatic vinyl compound-vinyl cyanide compound copolymer (B-3) may be prepared by solution polymerization, bulk polymerization, emulsion polymerization, or suspension polymerization, preferably bulk polymerization. Solution polymerization, bulk polymerization, emulsion polymerization, and suspension polymerization commonly practiced in the art to which the present invention pertains may be used in the present invention without particular limit.

First Polyamide

Based on 100 parts by weight of the styrene-based resin, the first polyamide resin of the present invention is preferably included in an amount of 0.5 to 5 parts by weight, more preferably 0.5 to 3 parts by weight, still more preferably 1 to 3 parts by weight, most preferably 1 to 2 parts by weight. Within this range, weather resistance may be excellent while maintaining mechanical properties and processability. In addition, due to low gloss, uniform surface gloss, and a low surface roughness value, a thermoplastic resin composition capable of providing an aesthetically pleasing effect and a soft feeling may be provided.

The first polyamide resin preferably has a melting temperature (Tm) of 230° C. or less, as a specific example, 210 to 230° C., as a preferred example, 220 to 230° C. Within this range, due to low gloss, uniform surface gloss, and a low surface roughness value, a thermoplastic resin composition capable of providing an aesthetically pleasing effect and a soft feeling may be provided.

Second Polyamide

Based on 100 parts by weight of the styrene-based resin, the second polyamide resin of the present invention is preferably included in an amount of 0.5 to 10 parts by weight, more preferably 1 to 6 parts by weight, still more preferably 2 to 5 parts by weight, most preferably 2 to 4 parts by weight or 3 to 4 parts by weight. Within this range, weather resistance may be excellent while maintaining mechanical properties and processability. In addition, due to low gloss, uniform surface gloss, and a low surface roughness value, a thermoplastic resin composition capable of providing an aesthetically pleasing effect and a soft feeling may be provided.

The second polyamide resin preferably has a melting temperature (Tm) of 250° C. or more, as a specific example, 250 to 280° C., as a preferred example, 250 to 270° C. Within this range, due to low gloss, uniform surface gloss, and a low surface roughness value, an aesthetically pleasing effect and a soft feeling may be realized.

In this description, melting temperature (Tm) may be measured using measurement methods commonly used in the art to which the present invention pertains. As a specific example, melting temperature (Tm) may be measured using a dynamic scanning calorimeter (DSC).

Both the first and second polyamide resins preferably have a relative viscosity (96% sulfuric acid solution) of 2.5 or less, as a specific example, 2.0 to 2.5, as a preferred example, 2.2 to 2.5. Within this range, weather resistance may be excellent while maintaining mechanical properties and processability. In addition, due to low gloss, uniform surface gloss, and a low surface roughness value, a thermoplastic resin composition capable of providing an aesthetically pleasing effect and a soft feeling may be provided.

In this description, unless defined otherwise, "%" means "% by weight".

A total weight of the first and second polyamide resins is preferably 1 to 10 parts by weight, more preferably 3 to 8 parts by weight, still more preferably 5 to 6 parts by weight based on 100 parts by weight in total of the styrene-based resins. Within this range, weather resistance may be excellent while maintaining mechanical properties and processability. In addition, due to low gloss, uniform surface gloss, and a low surface roughness value, a thermoplastic resin composition capable of providing an aesthetically pleasing effect and a soft feeling may be provided.

In this description, when the first and second polyamide resins each satisfy the melting temperature and the relative viscosity according to the present invention, the types thereof are not particularly limited. As a specific example, the first and second polyamide resins may include one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, preferably one or more selected from the group consisting of polyamide 6, polyamide 12, and polyamide 66.

Polymerization methods commonly practiced in the art to which the present invention pertains may be used to prepare the first and second polyamide resins. In addition, commercially available polyamides may be used when the polyamides conform to the definition of the polyamide according to the present invention.

Thermoplastic Resin Composition

In the case of the thermoplastic resin composition of the present invention, when a gloss value at 45° of a film prepared by film-processing pellets, which have been extruded at 280° C., under conditions of barrel temperatures of 50° C., 190° C., 190° C., and 190° C. and die temperatures of 200° C., 200° C., and 200° C. and a gloss value at 45° of a film prepared by film-processing pellets, which have been extruded at 280° C., under conditions of barrel temperatures of 50° C., 200° C., 210° C., and 210° C. and die temperatures of 220° C., 220° C., and 230° C. are measured, the deviation between the measured gloss values may be 1 or less, preferably 0.7 or less. Within this range, due to uniform and low gloss, and improvement in surface texture, an exterior material having excellent aesthetics, such as softness, luxuriousness, and naturalness, and excellent processing stability may be provided.

In the case of the thermoplastic resin composition, when a gloss value at 60° of a film prepared by film-processing pellets, which have been extruded at 280° C., under conditions of barrel temperatures of 50° C., 190° C., 190° C., and 190° C. and die temperatures of 200° C., 200° C., and 200° C. and a gloss value at 60° of a film prepared by film-processing pellets, which have been extruded at 280° C., under conditions of barrel temperatures of 50° C., 200° C., 210° C., and 210° C. and die temperatures of 220° C., 220° C., and 230° C. are measured, the deviation between the measured gloss values may be 3.0 or less, 2.8 or less, 2.0 or less, 1.5 or less, 1 or less. Within this range, due to uniform and low gloss, and improvement in surface texture, an exterior material having excellent aesthetics such as softness, luxuriousness, and naturalness may be provided.

In the case of the thermoplastic resin composition, when a gloss value at 75° of a film prepared by film-processing pellets, which have been extruded at 280° C., under conditions of barrel temperatures of 50° C., 190° C., 190° C., and 190° C. and die temperatures of 200° C., 200° C., and 200° C. and a gloss value at 75° of a film prepared by film-processing pellets, which have been extruded at 280° C., under conditions of barrel temperatures of 50° C., 200° C., 210° C., and 210° C. and die temperatures of 220° C., 220° C., and 230° C. are measured, the deviation between the measured gloss values may be 8.2 or less, 8.1 or less, 8.0 or less, preferably 6.5 or less. Within this range, due to uniform and low gloss, and improvement in surface texture, an exterior material having excellent aesthetics such as softness, luxuriousness, and naturalness may be provided.

For example, the thermoplastic resin composition may include 0.1 to 5 parts by weight, preferably 0.1 to 2 parts by weight, more preferably 0.1 to 1 part by weight, still more preferably 0.3 to 0.6 parts by weight of an inorganic pigment based on 100 parts by weight in total of the thermoplastic resin composition. Within this range, weather resistance and hiding power may be excellent.

For example, the inorganic pigment may include one or more selected from the group consisting of metal compounds including Ti, Pb, Fe, and Cr and carbon black. The metal compounds are preferably metal oxides or metal hydroxides. As a specific example, the inorganic pigment may include one or more selected from the group consisting of $TiO_2$ and zinc oxide as white inorganic pigments; carbon black and graphite as black inorganic pigments; IOR, cadmium red, and red lead ($Pb_3O_4$) as red inorganic pigments; chrome yellow, zinc chromate, and cadmium yellow as yellow inorganic pigments; and chrome green and zinc green as green inorganic pigments, and most preferably, is $TiO_2$, which is a white inorganic pigment.

The thermoplastic resin composition preferably has an average surface roughness (Ra) of 2.3 or less, more preferably 2.1 or less, as a preferred example, 1.9 to 2.3, as a more preferred example, 1.9 to 2.1, as measured at 5 points using an optical profiler system. Within this range, softness, luxuriousness, and naturalness may be improved.

The thermoplastic resin composition is preferably a matte thermoplastic resin composition having a film gloss of 15 or less as measured at 60° using a gloss meter VG7000. More preferably, the thermoplastic resin composition is a matte thermoplastic resin composition having a film gloss of 10 or less, still more preferably 7 or less. Within this range, matte properties and physical property balance may be excellent. Thus, the thermoplastic resin composition of the present invention may be referred to as a matte thermoplastic resin composition.

For example, the thermoplastic resin composition may have a weather resistance ($\Delta E$) of 7.0 or less, preferably 6.5 or less, more preferably 6.0 or less as measured for 2,000 hours according to SAE J1960.

For example, the thermoplastic resin composition may have a melt index (MI) (220° C., load: 10 kg) of 4 g/10 min or more, preferably 4 to 10 g/10 min, as a preferred example, 4 to 8 g/10 min, as a more preferred example, 4 to 6.5 g/10 min as measured according to ASTM D1238. Within this range, processability may be excellent, and due to a low surface roughness value, softness, luxuriousness, and naturalness may be excellent.

For example, the thermoplastic resin composition may have a tensile strength (⅛ inch) of 350 kg/cm² or more, preferably 370 kg/cm² or more, more preferably 400 kg/cm² or more, still more preferably 420 kg/cm² or more, as a specific example, 380 to 490 kg/cm², as measured according to ASTM 638.

For example, the thermoplastic resin composition may have an Izod impact strength (¼ inch) of 8 kg-cm/cm or more, preferably 10 kg-cm/cm or more, more preferably 11 kg-cm/cm or more, as a specific example, 10 to 12 kg-cm/ cm, as measured according to ASTM 256. Within this range, the thermoplastic resin composition may be suitable for siding materials, roofing materials, and decking materials.

When necessary, the thermoplastic resin composition may further include 0.01 to 5 parts by weight, 0.05 to 3 parts by weight, 0.1 to 2 parts by weight, or 0.5 to 1 part by weight of one or more selected from the group consisting of a lubricant, a pigment, a heat stabilizer, a light stabilizer, a dye, a colorant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

A method of preparing the thermoplastic resin composition of the present invention include a step of mixing 100 parts by weight of styrene-based resins; 0.5 to 5 parts by weight of a first polyamide resin having a relative viscosity of 2.5 or less and a melting temperature (Tm) of 230° C. or less; and 0.5 to 10 parts by weight of a second polyamide resin having a relative viscosity of 2.5 or less and a melting temperature (Tm) of 250° C. or more, and a step of manufacturing pellets from the mixture at 220 to 280° C. using an extrusion kneader. In this case, a thermoplastic resin composition having excellent weather resistance, having low and uniform surface gloss, and capable of providing an aesthetically pleasing effect and a soft feeling due to a low surface roughness value thereof while having mechanical properties and processability equal or superior to those of conventional ASA resins may be provided.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 290° C., more preferably 250 to 290° C., still more preferably 270 to 290° C. In this case, the temperature is the temperature of a cylinder.

Extrusion kneaders commonly used in the art to which the present invention pertains may be used without particular limit, and a twin-screw extrusion kneader is preferably used.

<Exterior Material>

An exterior material of the present invention includes the thermoplastic resin composition of the present invention. In this case, a thermoplastic resin composition having excellent aesthetics, such as softness, luxuriousness, and naturalness, due to uniform and low gloss, and improvement in surface texture while having mechanical properties and processability equal or superior to those of conventional ASA resins may be provided.

For example, the exterior material may be a coextrusion-molded article or an injection-molded article, preferably a siding material, a decking material, or a roofing material, more preferably a sliding door or a window.

The exterior material is preferably prepared by extruding or injecting the thermoplastic resin composition of the present invention at a molding temperature of 190 to 250° C., preferably 190 to 230° C., more preferably 190 to 220° C. Within this range, a matte effect may be imparted to a product.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 7 and Comparative Examples 1 to 7 are as follows.

A-1) First graft copolymer prepared by emulsion polymerization (core: 50% by weight of a butyl acrylate polymer having an average particle diameter of 100 nm, shell: 36% by weight of styrene, 14% by weight of acrylonitrile)

A-2) Second graft copolymer prepared by emulsion polymerization (core: 50% by weight of a butyl acrylate polymer having an average particle diameter of 400 nm, shell: 37% by weight of styrene, 13% by weight of acrylonitrile)

B-1) SAN resin (92RF) having a weight average molecular weight of 120,000 g/mol prepared by bulk polymerization B-2) SAN resin (90HR) having a weight average molecular weight of 150,000 g/mol prepared by bulk polymerization B-3) SAN resin (97HC) having a weight average molecular weight of 173,000 g/mol prepared by bulk polymerization B-4) SAN resin (200UH) having a weight average molecular weight of 90,000 g/mol prepared by bulk polymerization B-5) SAMMA resin (XT510) having a weight average molecular weight of 130,000 g/mol prepared by bulk polymerization C-1) PA 6 having a melting temperature (Tm) of 221° C. and a relative viscosity of 2.5

C-2) PA 12 (Rilsamid Aesno TL) having a melting temperature (Tm) of 180° C.

C-3) PA 6.6 having a melting temperature (Tm) of 259° C. and a relative viscosity of 2.4

C-4) PA 6.6 having a melting temperature (Tm) of 261° C. and a relative viscosity of 2.7

Examples 1 to 7 and Comparative Examples 1 to 7

According to the components and contents shown in Table 1 below, pellets were prepared at 280° C. using a 28 pi, L/D 36 standard extrusion kneader (twin-screw extruder).

Melt index was measured using the prepared pellets.

In addition, a film with a uniform thickness of 0.15 T was prepared from the pellets using a film extruder, and the film gloss and the surface roughness value (Ra) of the prepared film were measured according to the following measurement methods. At this time, a single-screw extruder for sheet molding (model: E20T, 20 pi, L/D: 25, Collin Co.) was used as the film extruder, and temperature conditions were set as follows: barrel temperatures of 50, 200, 210, and 210° C. and die temperatures of 220, 220, and 230° C. in order from the inlet of the extruder. Prior to loading into the film extruder, the pellets were sufficiently dried in an oven at 80° C. for 3 hours or more to eliminate the effect of moisture. Then, the dried pellets were fed into the film extruder through the inlet of the film extruder to prepare a film with a uniform thickness of 0.15 T. The temperature of a rear roller was set to 85° C. using water as a medium, and as shown in the FIGURE, the roller was configured such that only one side of a resin extruded through a T-die was in contact with a roll. At this time, the screw RPM of the film extruder was fixed to 100, and the linear velocity of the roll was adjusted so that a sheet had a thickness of 0.15 T. At this time, the surface roughness value (Ra) and the film gloss of a surface in contact with the first roll among extruded sheet surfaces were measured. For reference, when measuring with a surface not in contact with the first roll, a difference may occur in surface roughness.

model: WSI Envelope, and scan range: ±30 μm), and an average value for the measured surface roughness values was calculated. When the surface roughness value is low, texture is smooth, and gloss is even when touched by hand.

Weather resistance: Measurement was performed for 2,000 hours according to SAE J1960, and L1E was calculated using Equation 1 below. Based on the obtained ΔE value, weather resistance was evaluated. As the ΔE value decreases, weather resistance increases.

$$\Delta E = \sqrt{\{(\Delta L)^2 + (\Delta a)^2 + (\Delta b)^2\}} \qquad \text{[Equation 1]}$$

(√: square root sign)

TABLE 1

| Parts by weight | Examples | | | | | | | Comparative Examples | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| A-1 | 30 | 30 | 26 | 20 | 16 | 16 | 29 | 20 | 30 | 26 | 12 | 16 | 16 | 30 |
| A-2 | 20 | 20 | 22 | 30 | 28 | 28 | 22 | 30 | 20 | 22 | 26 | 28 | 28 | 20 |
| B-1 | | | | 45 | | | | 45 | | | | | | |
| B-2 | 22 | 22 | 20 | | | | | | 22 | 20 | 40 | | | 22 |
| B-3 | 28 | 28 | 32 | | | | 39 | | 28 | 32 | 22 | | | 28 |
| B-4 | | | | | 15 | | | | | | | 15 | | |
| B-5 | | | | | 41 | 56 | 10 | | | | | 41 | 56 | |
| C-1 | 1 | | 1 | 2 | 1 | 1 | 1 | | | | | | | 1 |
| C-2 | | 1 | | | | | | | | | | | | |
| C-3 | 4 | 4 | 4 | 4 | 4 | 4 | 4 | 4 | 5 | 5 | 5 | 5 | 5 | |
| C-4 | | | | | | | | | | | | | | 4 |
| TiO$_2$ pigment | 0.5 | 0.5 | 0.5 | 0.5 | 0.5 | 0.5 | 0.5 | 0.5 | 0.5 | 0.5 | 0.5 | 0.5 | 0.5 | 0.5 |
| Melt index | 4.8 | 5.1 | 4.5 | 6.3 | 4.8 | 5.0 | 4.3 | 7.0 | 4.6 | 4.0 | 7.8 | 4.6 | 4.8 | 4.7 |
| Tensile strength | 420 | 424 | 427 | 385 | 431 | 422 | 412 | 388 | 423 | 430 | 483 | 434 | 416 | 419 |
| Impact strength | 11.31 | 11.27 | 11.9 | 10.39 | 11.19 | 10.2 | 10.1 | 13.19 | 10.0 | 10.7 | 7.6 | 9.8 | 10.0 | 10.27 |
| Gloss | 6.8 | 8.6 | 7.7 | 6.8 | 7.0 | 7.8 | 8.8 | 7.2 | 6.5 | 6.4 | 6.7 | 5.9 | 6.7 | 5.2 |
| Surface roughness | 2.27 | 1.56 | 2.3 | 2.3 | 2.3 | 1.9 | 2.16 | 2.69 | 2.9 | 2.92 | 4.54 | 3.1 | 2.5 | 2.83 |
| ΔE | 1.8 | — | 1.4 | | 5.9 | 5.9 | 2.6 | — | — | — | — | 6.1 | 5.9 | — |

In addition, the prepared pellets were injected at a molding temperature of 220° C. to prepare a specimen for measuring physical properties, and the tensile strength and impact strength of the specimen were measured.

Test Example 1

The properties of pellets, sheets, and specimens prepared in Examples 1 to 7 and Comparative Examples 1 to 6 were measured according to the following methods, and the results are shown in Table 1 below.

Melt index (MI): Melt index was measured using the prepared pellets under conditions of 220° C./10 kg according to ASTM D1238.

Tensile strength (kg/cm$^2$): Tensile strength was measured according to ASTM 638.

Izod impact strength (kg·cm/cm): Izod impact strength was measured according to ASTM 256.

Film gloss: Film gloss was measured at 60° using a gloss meter VG7000.

Surface roughness value (Ra): Surface roughness values for 5 points were measured using an optical profiler system (NV-2700, Nano System Co., Ltd.) (objective lens (lox)×ocular lens (1×) (F.O.V: 628 μm×471 μm), As shown in Table 1, it can be confirmed that, compared to Comparative Examples 1 to 7 having compositions partially different from the composition of the thermoplastic resin composition (see Examples 1 to 7) according to the present invention, the surface roughness value of the thermoplastic resin composition of the present invention decreases significantly, indicating that the thermoplastic resin composition of the present invention may provide an aesthetically pleasing effect, a soft feeling, and a luxurious feeling while maintaining mechanical properties, such as melt index, tensile strength, and impact strength, and surface gloss equal or superior to those of the thermoplastic resin compositions of Comparative Examples 1 to 7. In particular, in the case of Example 2 according to the present invention in which both PA 12 and PA 6.6 are included and in the case of Example 6 in which 50 to 60% by weight of a polyamide polymethacrylate resin is included, surface roughness is less than 2.0, indicating that a high-quality resin having good aesthetics may be prepared.

In addition, it can be confirmed that, in the case of Comparative Example 7 in which a heterogeneous polyamide is included. Since PA 6.6 having a viscosity outside the range of the present invention is included, surface roughness is poor.

Test Example 2

In addition, a film with a uniform thickness of 0.15 T was prepared from the pellets prepared in Examples 1 to 7 and Comparative Examples 1 to 6 using a film extruder, and the physical properties, such as film gloss, of the prepared film were measured and the results are shown in Table 2 below. At this time, a single-screw extruder for sheet molding (model: E20T, 20 pi, L/D: 25, Collin Co.) was used as the film extruder. For 190° C. processing, temperature conditions were set as follows: barrel temperatures of 50, 190, 190, and 190° C. and die temperatures of 200, 200, and 200° C. in order from the inlet of the extruder. For 220° C. processing, temperature conditions were set as follows: barrel temperatures of 50, 200, 210, and 210° C. and die temperatures of 220, 220, and 230° C. in order from the inlet of the extruder. Prior to loading into the film extruder, the pellets were sufficiently dried in an oven at 80° C. for 3 hours or more to eliminate the effect of moisture. Then, the dried pellets were fed into the film extruder through the inlet of the film extruder to prepare a film with a uniform thickness of 0.15 T. The temperature of a rear roller was set to 85° C. using water as a medium, and as shown in the FIGURE, the roller was configured such that only one side of a resin extruded through a T-die was in contact with a roll. At this time, the screw RPM of the film extruder was fixed at 100, and the linear velocity of the roll was adjusted so that a sheet had a thickness of 0.15 T.

TABLE 2

| Classification | Film gloss (75°) | | | Film gloss (60°) | | |
| --- | --- | --- | --- | --- | --- | --- |
| | 220° C. processing | 190° C. processing | Gloss deviation (190° C.-220° C.) | 220° C. processing | 190° C. processing | Gloss deviation (190° C.-220° C.) |
| Example 1 | 19.2 | 27.3 | 8.1 | 6.8 | 9.6 | 2.8 |
| Example 2 | 23.5 | 31.1 | 7.6 | 9.6 | 10.6 | 1.0 |
| Example 3 | 20.1 | 26.4 | 6.3 | 7.7 | 8.7 | 1.0 |
| Example 4 | 19.7 | 16.3 | −3.4 | 6.8 | 5.0 | −1.8 |
| Example 5 | 20.0 | 25.0 | 5.0 | 7.0 | 7.6 | 0.6 |
| Example 6 | 20.8 | 26.0 | 5.2 | 7.8 | 8.6 | 0.8 |
| Example 7 | 21.2 | 27.7 | 6.5 | 8.8 | 10.3 | 1.5 |
| Comparative Example 1 | 16.9 | 27.9 | 11.0 | 7.2 | 10.9 | 3.7 |
| Comparative Example 2 | 16.5 | 27.9 | 11.4 | 6.5 | 9.9 | 3.4 |
| Comparative Example 3 | 16.4 | 25.3 | 8.9 | 6.4 | 10.9 | 4.5 |
| Comparative Example 4 | 16.7 | 25.2 | 8.5 | 6.7 | 11.1 | 4.4 |
| Comparative Example 5 | 15.1 | 23.5 | 8.4 | 5.9 | 10.2 | 4.3 |
| Comparative Example 6 | 16.7 | 25.0 | 8.3 | 6.7 | 11.2 | 4.5 |

Here, the film gloss of a surface in contact with the first roll among extruded sheet surfaces was measured. As shown in Table 2, compared to Comparative Examples 1 to 6, in the case of Examples 1 to 7 according to the present invention, gloss deviation due to difference in sheet extrusion conditions is insignificant. Thus, even when the processing conditions are varied, uniform physical properties, especially uniform gloss values, may be realized.

Test Example 3

Sheets having a thickness of 0.15 T were prepared in the same manner as in Example 3 and Comparative Example 3, except that extrusion temperatures in the preparation of pellets and processing temperatures in the preparation of sheets were determined as described in Table 3 below. Then, the film gloss of the sheet was measured, and the obtained results are shown in Table 3 below.

TABLE 3

| Classification | Pellet extrusion temperature (° C.) | Sheet processing temperature (° C.) | Film gloss | | | Gloss deviation (75°) |
| --- | --- | --- | --- | --- | --- | --- |
| | | | 45° | 60° | 75° | |
| Example 3 | 270 | 190 | 8.1 | 8.6 | 22.7 | −3 |
| | 280 | 190 | 8.1 | 8.7 | 26.4 | −6 |
| | 270 | 220 | 7.2 | 7.5 | 17.6 | 3 |
| | 280 | 220 | 7.4 | 7.7 | 20.1 | — |

TABLE 3-continued

| Classification | Pellet extrusion temperature (° C.) | Sheet processing temperature (° C.) | Film gloss 45° | Film gloss 60° | Film gloss 75° | Gloss deviation (75°) |
|---|---|---|---|---|---|---|
| Comparative Example 3 | 270 | 190 | 8.6 | 10.2 | 22.8 | −6.4 |
| | 280 | 190 | 9 | 10.9 | 25.3 | −8.9 |
| | 270 | 220 | 6.7 | 7.7 | 18.4 | −2 |
| | 280 | 220 | 5.9 | 6.4 | 16.4 | — |

As shown in Table 3, it can be confirmed that, compared to Comparative Example 3 not according to the present invention, in the case of Example 3 according to the present invention, gloss deviation due to difference in sheet extrusion conditions is insignificant. Thus, even when the processing conditions are varied, uniform physical properties, especially uniform gloss values, may be realized.

The invention claimed is:

1. A thermoplastic resin composition, comprising:
100 parts by weight of a styrene-based resin;
0.5 to 5 parts by weight of a first polyamide resin having a melting temperature (Tm) of 230° C. or less; and
0.5 to 10 parts by weight of a second polyamide resin having a melting temperature (Tm) of 250° C. or more,
wherein both the first and second polyamide resins have a relative viscosity (1 g per 100 mL of 96% aq. sulfuric acid) of 2.5 or less.

2. The thermoplastic resin composition according to claim 1, wherein, when a gloss value at 60° of a film prepared by extruding the thermoplastic resin composition at 280° C. and film-processing at 190° C. and a gloss value at 60° of a film prepared by extruding the thermoplastic resin composition at 280° C. and film-processing at 220° C. are measured, a deviation between the measured gloss values is 3.0 or less.

3. The thermoplastic resin composition according to claim 1, wherein the styrene-based resin comprises a first styrene-based resin and a second styrene-based resin,
wherein the first styrene-based resin comprises one or more selected from the group consisting of an acrylate-aromatic vinyl compound-vinyl cyanide compound graft copolymer (A-1) containing acrylate rubber having a DLS average particle diameter of 0.05 to 0.2 μm or a TEM average particle diameter of 0.03 to 0.2 μm and an acrylate-aromatic vinyl compound-vinyl cyanide compound graft copolymer (A-2) containing acrylate rubber having a DLS average particle diameter of 0.3 to 0.5 μm or a TEM average particle diameter of 0.25 to 0.45 μm, and
the second styrene-based resin comprises one or more selected from the group consisting of an aromatic vinyl compound-vinyl cyanide compound copolymer (B-1), a heat-resistant styrene-based resin (B-2), and a methacrylate-aromatic vinyl compound-vinyl cyanide compound copolymer (B-3).

4. The thermoplastic resin composition according to claim 3, wherein the styrene-based resin comprises 10 to 70% by weight of the first styrene-based resin and 30 to 90% by weight of the second styrene-based resin.

5. The thermoplastic resin composition according to claim 3, wherein the acrylate-aromatic vinyl compound-vinyl cyanide compound graft copolymer (A-1) comprises 40 to 60% by weight of the acrylate rubber having the DLS average particle diameter of 0.05 to 0.2 μm or the TEM average particle diameter of 0.03 to 0.2 μm, 20 to 40% by weight of a first aromatic vinyl compound, and 10 to 20% by weight of a first vinyl cyanide compound,
the acrylate-aromatic vinyl compound-vinyl cyanide compound graft copolymer (A-2) comprises 40 to 60% by weight of the acrylate rubber having the DLS average particle diameter of 0.3 to 0.5 μm or the TEM average particle diameter of 0.25 to 0.45 μm, 25 to 45% by weight of a second aromatic vinyl compound, and 10 to 20% by weight of a second vinyl cyanide compound,
the aromatic vinyl compound-vinyl cyanide compound copolymer (B-1) comprises 65 to 80% by weight of a third aromatic vinyl compound and 20 to 35% by weight of a third vinyl cyanide compound,
the heat-resistant styrene-based resin (B-2) comprises 65 to 75% by weight of α-methylstyrene and 25 to 30% by weight of a fourth vinyl cyanide compound, and
the methacrylate-aromatic vinyl compound-vinyl cyanide compound copolymer (B-3) comprises 65 to 85% by weight of a methacrylate-based monomer, 10 to 30% by weight of a fourth aromatic vinyl compound, and 5 to 10% by weight of a fifth vinyl cyanide compound.

6. The thermoplastic resin composition according to claim 3, wherein, based on a total weight of the styrene-based resin, the first styrene-based resin comprises 10 to 35% by weight of the acrylate-aromatic vinyl compound-vinyl cyanide compound graft copolymer (A-1) and 15 to 40% by weight of the acrylate-aromatic vinyl compound-vinyl cyanide compound graft copolymer (A-2).

7. The thermoplastic resin composition according to claim 1, further comprising 0.1 to 5 parts by weight of an inorganic pigment.

8. The thermoplastic resin composition according to claim 1, wherein the thermoplastic resin composition has an average surface roughness (Ra) of 2.3 or less as measured at 5 points using an optical profiler system.

9. The thermoplastic resin composition according to claim 1, wherein the thermoplastic resin composition is a matte thermoplastic resin composition having a film gloss of 15 or less as measured at 60°.

10. The thermoplastic resin composition according to claim 3, wherein the aromatic vinyl compound-vinyl cyanide compound copolymer (B-1) comprises one or more selected from the group consisting of an aromatic vinyl compound-vinyl cyanide compound copolymer (i) having a weight average molecular weight of 90,000 to 135,000 g/mol; an aromatic vinyl compound-vinyl cyanide compound copolymer (ii) having a weight average molecular weight of greater than 135,000 g/mol and 155,000 g/mol or less; and an aromatic vinyl compound-vinyl cyanide compound copolymer (iii) having a weight average molecular weight of greater than 155,000 g/mol and 200,000 g/mol or less.

11. The thermoplastic resin composition according to claim 10, wherein, based on a total weight of the styrene-based resin, the aromatic vinyl compound-vinyl cyanide compound copolymer (i) is present in an amount of 30 to 60% by weight, the aromatic vinyl compound-vinyl cyanide compound copolymer (ii) is present in an amount of 10 to 40% by weight, and the aromatic vinyl compound-vinyl cyanide compound copolymer (iii) is present in an amount of 10 to 40% by weight.

12. The thermoplastic resin composition according to claim 3, wherein, based on a total weight of the styrene-based resin, the heat-resistant styrene-based resin (B-2) is present in an amount of 1 to 25% by weight, or the methacrylate-aromatic vinyl compound-vinyl cyanide compound copolymer (B-3) is present in an amount of 5 to 65% by weight.

13. An exterior material, comprising the thermoplastic resin composition according to claim 1.

14. The exterior material according to claim 13, wherein the exterior material is a siding material, a roofing material, or a decking material.

15. The thermoplastic resin composition according to claim 9, wherein, when the thermoplastic resin composition is extruded at 280° C. and processed at 190° C., the thermoplastic resin composition has a film gloss at 60° that deviates by 3.0 or less as compared to a film gloss at 60° of the thermoplastic resin composition extruded at 280° C. and processed at 220° C.

\* \* \* \* \*